Jan. 25, 1966 J. M. HITE 3,230,628
GAUGE FOR MEASURING ORTHOPEDIC SCREWS
Filed May 22, 1963
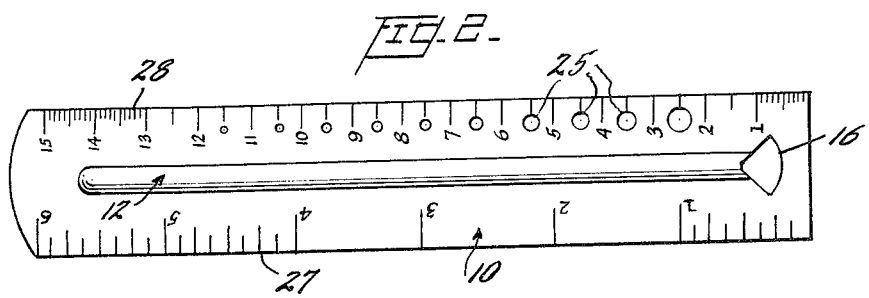
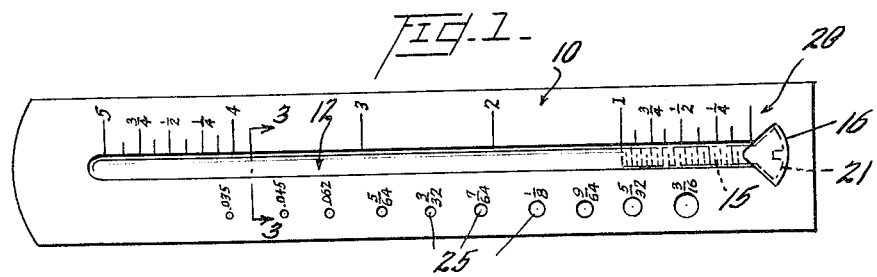
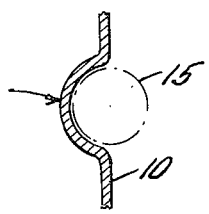
INVENTOR
James M. Hite,
BY Watson, Cole, Grindle & Watson
ATTORNEYS

United States Patent Office 3,230,628
Patented Jan. 25, 1966

3,230,628
GAUGE FOR MEASURING ORTHOPEDIC SCREWS
James M. Hite, Warsaw, Ind., assignor to Zimmer Manufacturing Company, Warsaw, Ind., a corporation of Indiana
Filed May 22, 1963, Ser. No. 282,452
2 Claims. (Cl. 33—174)

This invention relates to scales and gauges and more particularly, to surgical aids which accurately and readily determine the dimensions of orthopedic screws, Kirchner wires and Steinmann pins.

It is imperative that orthopedic surgeons be well organized in operations for the repair of bones. Thus, selection of a wrong length screw or a wire or pin of unsuited diameter in the pressure of operating room procedure could cause disastrous results. Accordingly, it is an object of the invention to produce a sanitary unitary gauge, for use by orthopedic surgeons or technicians, which permits fast accurate measurements and leaves little room for error even when measurements are made while working under great mental stress and pressure.

The problem of measurement of a screw by conventional scales for example, may be visualized. The head must held in proper relationship to the screw body along the scale. Also, a reasoned decision must be made as to the starting point on the head from which to measure the length of the screw. Even the most thorough surgeon may become confused in the measurement. Similarly, errors may be made in choice of pins or wires if a convenient error-proof gauge is not handy for the use of the surgeon or technician.

Accordingly, it is an object of the present invention to provide an improved versatile orthopedic scale and gauge.

It is a more specific object of the invention to provide a convenient and essentially error-proof gauge for orthopedic screws.

In accordance with the invention, therefore, the gauge is in the form of a stainless steel scale having calibrations in millimeters and inches along the edges of one face and having a gauge for measuring the length of orthopedic screws and the diameter of wires and pins calibrated on the other face. Stainless steel is used to provide easy sanitation and because it holds its dimensions well under normal temperature ranges. The scale is constructed to receive the body of orthopedic screws in an indented channel formed longitudinally along the scale body and headed by an aperture shaped to receive the screw head in fitted position. Thus, the screw may be inserted readily and is held firmly in a matrix position contiguous to a calibrated scale gauging the length of such screws in one-eighth steps. In this manner, the screw is held in a fixed relationship alongside the gauge markings so that longitudinal motion may not be introduced. Only a slight degree of longitudinal motion coupled with parallax error or judgment as to the head starting position would be required to introduce an error of one-eighth of an inch. Further, the scale has a series of scaled apertures for gauging the standard sizes of Kirchner wires and Steinmann pins so that the single unitary gauge provides the surgeon with a versatile, yet simple, surgical aid.

Further objects and features of the invention will be described with reference to the accompanying drawing, wherein:

FIGURE 1 shows a front face view of a gauge constructed in accordance with the invention;

FIGURE 2 is a back face view of the gauge, and

FIGURE 3 is a section view of the gauge as taken along line 3—3 of FIGURE 1.

In the front view of FIGURE 1 is shown the gauge structure for measurement of orthopedic screws and Kirchner wires or Steinmann pins. Basically, a scale in the form of elongated stainless steel plate 10 is provided. Downwardly in this plate is formed an indented channel 12 extending longitudinally along the center of the plate. The channel, as may be seen from the section view of FIGURE 3, is formed to receive the body of an orthopedic screw 15.

At an extremity of the channel, the plate 10 forms a generally arcuate aperture 16, as seen in FIGURE 2, which serves to receive the head 21 of an orthopedic screw 15 in fixed position (as shown in FIGURE 1). Thus, the aperture 16 and channel 12 form a matrix in which the screw 15 may be inserted readily to provide an unquestionable gauge of length along the scale 20, which is calibrated in one-eighth inch increments to indicate the standard lengths of orthopedic screws. The scale is etched or pressed into the plate 10 so that no danger of error is introduced because of worn indicia.

Note the close fitting position of head 21 of screw 15 in the aperture 16 as seen in FIGURE 1. This assures accurate measurements since there is no danger of measuring from the wrong point on the screw, such as the crown. It is evident that in orthopedic surgery too long or too short a screw could lead to radical complications, and the chance for such error is minimized by the gauge afforded by this invention. Also, the matrix arrangement serves to eliminate any parallax error introduced by sighted measurements along a standard scale.

Similarly, accuracy of measurement of pins and wires is facilitated by the series of spaced circular aperture gauges 25 extending along one side of the plate 10. These have identifying calibration markings matching standard sizes of Kirchner wires or Steinmann pins used in orthopedic surgery. These gauges serve in combination with the screw gauges and the scale measurements to provide the surgeon with a single versatile scale-gauge so that he need not carry several instruments for reference. This reduces chances for error and saves time in the operating room.

From the back view of FIGURE 2 it is seen that the channel and aperture structure is laid out so that it does not interfere with a standard scale calibration for inches and centimeters on the two straight edges 27 and 28 respectively. Note that the end 31 of the plate 10 is rounded so that it may be inserted in a pocket with less danger of tearing or snagging.

It is clear from the foregoing disclosure that an improved scale is provided having particular usefulness in the field of orthopedic surgery. Those features of novelty defining the invention with particularity are found in the following claims.

I claim:

1. A scale particularly adapted for measuring the length of screws comprising in combination, an elongated plate having an indented channel formed longitudinally therein to receive the body of the screw, gauge markings along the channel for determining the length of the screws, and an aperture formed in the plate at an extremity of the channel shaped to receive in fitted position the head of a screw to hold it immovably in place in said channel thereby assuring that the body of the screw rests in said channel in a fixed relationship alongside the gauge markings.

2. A gauge for measuring orthopedic screws comprising in combination, a stainless steel scale in the form of an elongated plate having incremental markings in millimeters and fractions of an inch on respective edges of one side, an indented channel formed longitudinally in the plate to receive a screw body on the other side, a generally arcuate aperture formed in the plate at one extremity of the channel shaped to receive the heads of orthopedic screws in fixed position so that the body of the screws rests immovably in said channel, gauge inscriptions along the channel identifying the standard lengths of orthopedic screws, and a series of spaced circular aperture gauges formed by the plate along one side of the channel calibrated in standard diameter dimensions of Kirchner wires and Steinmann pins.

References Cited by the Examiner

UNITED STATES PATENTS

| | | | |
|---|---|---|---|
| 973,078 | 10/1910 | Seavey | 33—178 |
| 1,860,174 | 5/1932 | Cronk | 33—174 |
| 2,528,431 | 10/1950 | Greenberg | 33—199 |
| 2,576,659 | 11/1951 | Williams | 33—200 |

OTHER REFERENCES

Plastics World magazine, January 1953, page 29.

ROBERT B. HULL, *Primary Examiner.*

SAMUEL S. MATTHEWS, *Examiner.*